US011889609B2

(12) United States Patent
Kou et al.

(10) Patent No.: US 11,889,609 B2
(45) Date of Patent: Jan. 30, 2024

(54) ANNEALING SYSTEM AND ANNEALING METHOD INTEGRATED WITH LASER AND MICROWAVE

(71) Applicants: HIGHLIGHT TECH CORP., Tainan (TW); Finesse Technology Co., Ltd., Hsinchu County (TW)

(72) Inventors: Chwung-Shan Kou, Tainan (TW); Wen-Yung Yeh, Tainan (TW)

(73) Assignees: HIGHLIGHT TECH CORP., Tainan (TW); FINESSE TECHNOLOGY CO., LTD., Hsinchu County (TW)

( * ) Notice: Subject to any disclaimer, the term of this patent is extended or adjusted under 35 U.S.C. 154(b) by 78 days.

(21) Appl. No.: 17/742,446

(22) Filed: May 12, 2022

(65) Prior Publication Data

US 2022/0369430 A1 Nov. 17, 2022

Related U.S. Application Data

(60) Provisional application No. 63/302,974, filed on Jan. 25, 2022, provisional application No. 63/188,478, filed on May 14, 2021.

(30) Foreign Application Priority Data

May 5, 2022 (TW) .................................. 111117039

(51) Int. Cl.
| | | |
|---|---|---|
| *H05B 6/06* | (2006.01) | |
| *B23K 26/20* | (2014.01) | |
| *H05B 6/10* | (2006.01) | |

(52) U.S. Cl.
CPC ............... *H05B 6/06* (2013.01); *B23K 26/20* (2013.01); *H05B 6/101* (2013.01)

(58) Field of Classification Search
CPC .......... H05B 6/647; H05B 6/64; H05B 6/645; B23K 26/14; B23K 26/123; B23K 26/08; B23K 26/082
(Continued)

(56) References Cited

U.S. PATENT DOCUMENTS

| | | | | |
|---|---|---|---|---|
| 5,481,119 A | * | 1/1996 | Higashino | ............ H10N 60/124 |
| | | | | 505/190 |
| 2007/0298585 A1 | * | 12/2007 | Lubomirsky | ..... H01L 21/76229 |
| | | | | 257/E21.548 |
| 2009/0181552 A1 | * | 7/2009 | Shimomura | ............ H01L 21/84 |
| | | | | 438/795 |

FOREIGN PATENT DOCUMENTS

| | | |
|---|---|---|
| CN | 101536616 | 9/2009 |
| CN | 103460353 | 12/2013 |

(Continued)

*Primary Examiner* — Tu B Hoang
*Assistant Examiner* — Alba T Rosario-Aponte (57) ABSTRACT

Disclosed is an annealing system integrated with laser and microwave. The annealing system is provided with a microwave system, a laser system, and a measurement and control system. The microwave system provides a microwave energy to a first area of a to-be-annealed object for annealing the first area of the to-be-annealed object. The laser system uses a laser to provide a laser energy to a second area of the to-be-annealed object for annealing the second area of the to-be-annealed object. The measurement and control system monitors and controls a power of a microwave and/or a laser. The annealing system is capable of reducing a time required for an overall annealing, and also capable of avoiding cracks or defects caused by large stress differences.

17 Claims, 9 Drawing Sheets

(58) Field of Classification Search
USPC .............................. 219/680, 121.6; 438/795
See application file for complete search history.

(56) References Cited

FOREIGN PATENT DOCUMENTS

| | | | |
|---|---|---|---|
| JP | 2001223175 A | * | 8/2001 |
| JP | 2009194370 A | | 8/2009 |
| JP | 2015170662 | | 9/2015 |
| TW | 487959 B | | 5/2002 |
| TW | 200818321 A | | 4/2008 |
| TW | 200937531 A | | 9/2009 |
| WO | WO-0195017 A2 | * | 12/2001 ....... B29D 11/00442 |

* cited by examiner

ANNEALING SYSTEM AND ANNEALING METHOD INTEGRATED WITH LASER AND MICROWAVE

CROSS-REFERENCE TO RELATED APPLICATION

This application claims priority to U.S. Provisional Patent Application No. 63/188,478, filed on May 14, 2021; claims priority from U.S. Provisional Patent Application No. 63/302,974, filed on Jan. 25, 2022; and claims priority from Taiwan Patent Application No. 111117039, filed on May 5, 2022, each of which is hereby incorporated herein by reference in its entireties.

BACKGROUND OF THE INVENTION

1. Field of Invention

The invention relates to an annealing system and an annealing method, and more particularly to an annealing system and an annealing method integrated with laser and microwave.

2. Related Art

Although microwave annealing can provide faster heating and cooling rates, the heating rate of microwave resonant cavity is limited to 200° C./min, which is not suitable for annealing large-sized wafers, even less suitable for mass-processing. Although laser annealing is currently used in the technology, the laser annealing energy is too concentrated on the laser spot, which is prone to the problem of excessive diffusion of implanted ions, and being limited by the area of the laser spot, the to-be-annealed object cannot be heated uniformly, resulting in an excessive temperature difference between the focal point and the non-focal point, and stress and cracks or defects can be generated easily.

SUMMARY OF THE INVENTION

In view of the above, one object of the invention is to provide an annealing system and an annealing method integrated with laser and microwave to solve the above-mentioned problems of the prior art.

In order to achieve the aforementioned object, the invention provides an annealing system integrated with laser and microwave, comprising: a microwave system, the microwave system provides a microwave energy to a first area of a to-be-annealed object for annealing the first area of the to-be-annealed object; a laser system, the laser system provides a laser energy to a second area of the to-be-annealed object for annealing the second area of the to-be-annealed object; and a measurement and control system, the measurement and control system comprises a temperature measuring device, a power measuring device and a control device, the temperature measuring device monitors a temperature value of the to-be-annealed object, the power measuring device measures a power variation of at least one of the microwave energy provided by the microwave system and the laser energy provided by the laser system, wherein the control device correspondingly adjusts a first power of the microwave system providing the microwave energy and/or adjusts a second power of the laser system providing the laser energy according to the temperature value and the power variation.

Preferably, the first area comprises the second area.

Preferably, the microwave system integrally provides the microwave energy to the first area of the to-be-annealed object, and the laser system provides the laser energy to the second area of the to-be-annealed object by scanning.

Preferably, a first time interval during which the microwave system providing the microwave energy to the first area covers a second time interval during which the laser system providing the laser energy to the second area.

Preferably, a second time interval during which the laser system providing the laser energy to the second area covers a first time interval during which the microwave system providing the microwave energy to the first area.

Preferably, the microwave energy provided by the microwave system is provided to the first area along a first axial direction, the laser energy provided by the laser system is provided to the second area along a second axial direction, and an included angle between the first axial direction and the second axial direction ranges from 0 degree to 180 degrees.

The laser system comprises a laser generator and a lens set, the laser generator generates a laser, and the lens set guides the laser onto the second area of the to-be-annealed object.

Preferably, the microwave system comprises at least one microwave generator and a resonant cavity, the microwave generator generates a microwave, and the resonant cavity guides the microwave onto the first area of the to-be-annealed object.

Preferably, the microwave system and the laser system respectively provide the microwave energy and the laser energy from opposite sides of the to-be-annealed object.

Preferably, the microwave system and the laser system respectively provide the microwave energy and the laser energy from a same side of the to-be-annealed object.

Preferably, the lens set of the laser system is coaxially disposed on the resonant cavity of the microwave system to guide the laser onto the second area of the to-be-annealed object.

Preferably, the microwave system and the laser system respectively provide the microwave energy and the laser energy from a vertical side of the to-be-annealed object to the to-be-annealed object.

Preferably, the microwave system comprises two microwave generators and a resonant cavity, the two microwave generators generate two microwaves, and the resonant cavity respectively guides the two microwaves onto the first area of the to-be-annealed object from two opposite directions of the first axial direction.

Preferably, further comprising a microwave absorbing element, and the microwave absorbing element and the microwave system are located on opposite sides of the to-be-annealed object.

Preferably, the resonant cavity of the microwave system is penetrated with an opening, and the to-be-annealed object is moved positionally in the resonant cavity through the opening to receive the microwave energy.

Preferably, the power measuring device measures a forward signal and/or a reflected signal of at least one of the microwave system providing the microwave energy with a microwave and the laser system providing the laser energy with a laser to obtain the power variation.

Preferably, the power measuring device comprises measuring at least one of a forward signal and a reflected signal of the microwave system providing the microwave energy with a microwave, and at least one of a forward signal and a reflected signal of the laser system providing the laser energy with a laser.

Preferably, the microwave system further comprises an isolator and a matcher disposed between the microwave generator and the resonant cavity.

Preferably, the first area or the second area is located in a depth or on a surface of the to-be-annealed object.

In order to achieve the aforementioned object, the invention provides an annealing method integrated with laser and microwave, comprising: performing a microwave annealing procedure for providing a microwave energy to a first area of a to-be-annealed object with a microwave system; performing a laser annealing procedure for providing a laser energy to a second area of the to-be-annealed object with a laser system; and performing a measurement and control procedure for measuring a temperature value of the to-be-annealed object, and a power variation of at least one of the microwave energy provided by the microwave system and the laser energy provided by the laser system, thereby correspondingly adjusting a first power of the microwave system providing the microwave energy and/or a second power of the laser system providing the laser energy according to the temperature value and the power variation.

Preferably, the first area comprises the second area.

Preferably, the microwave system integrally provides the microwave energy to the first area of the to-be-annealed object, and the laser system provides the laser energy to the second area of the to-be-annealed object by scanning.

Preferably, a first time interval during which the microwave system providing the microwave energy to the first area covers a second time interval during which the laser system providing the laser energy to the second area.

Preferably, a second time interval during which the laser system providing the laser energy to the second area covers a first time interval during which the microwave system providing the microwave energy to the first area.

Preferably, the microwave system provides the microwave energy to the first area along a first axial direction, the laser system provides the laser energy to the second area along a second axial direction, and an included angle between the first axial direction and the second axial direction ranges from 0 degree to 180 degrees.

Preferably, the microwave system provides the microwave energy to the first area from two opposite directions of the first axial direction.

In summary, the annealing system and the annealing method integrated with laser and microwave of the invention have the following advantages:

(1) The invention uses the microwave energy and the laser energy to perform the synergistic annealing procedure, which is conducive to combining the advantages of microwave annealing and laser annealing.

(2) Raising a temperature of the to-be-annealed object by the microwave energy is conducive to increasing the laser energy absorption rate of the to-be-annealed object, so the laser energy required for performing the laser annealing procedure can be reduced, or a time required for the overall annealing can be reduced.

(3) By increasing temperatures of the second area and the other area (the non-second area) of the to-be-annealed object by the microwave energy, a temperature difference (thermal shock) between these two areas can be reduced to avoid cracks or defects caused by large differences in stress.

(4) The invention using the microwave energy to anneal the entire to-be-annealed object is capable of avoiding defects caused by a large temperature gradient, and also capable of solving the problem of excessive diffusion of implanted ions.

(5) In the invention, the microwave energy is used to anneal the whole to-be-annealed object, a specific laser wavelength is selected to correspond to the annealing target, and laser annealing can be optionally performed on an area with a specific depth.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

Figure 1:
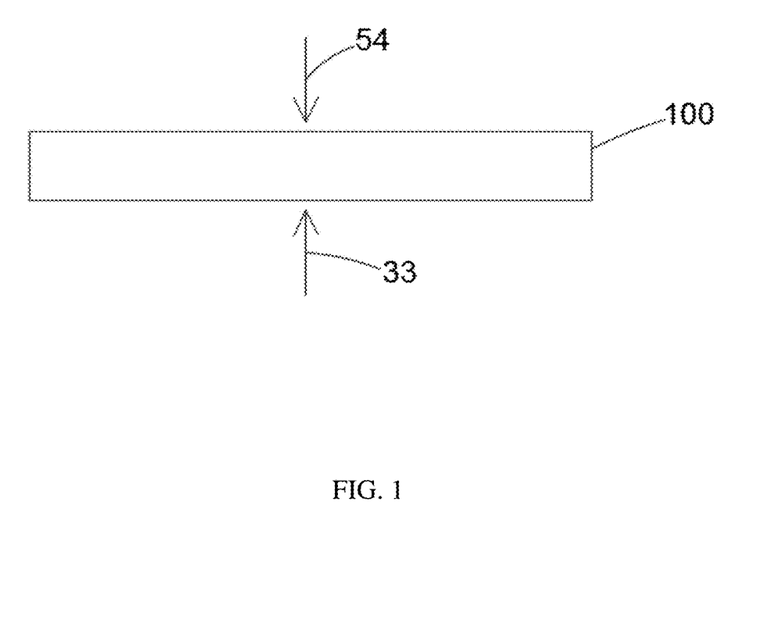
FIG. 1 is a schematic diagram of operation of an annealing system integrated with laser and microwave of the invention.
Figure 2:
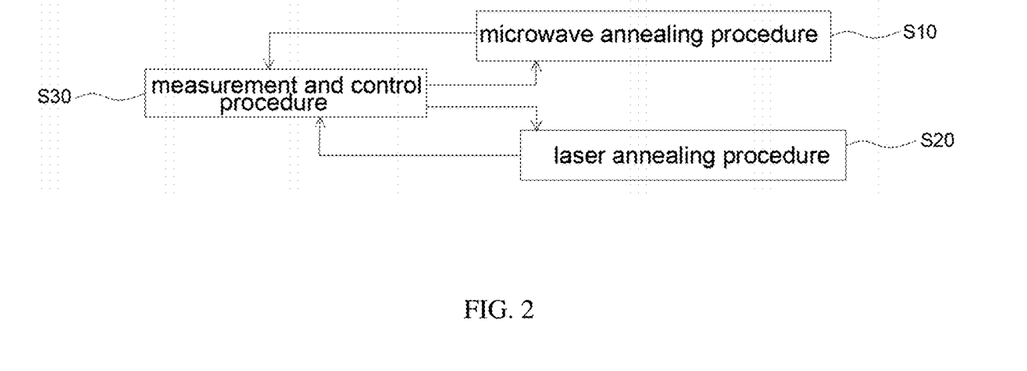
FIG. 2 is a flow chart of operation of an annealing method integrated with laser and microwave of the invention.
Figure 3:
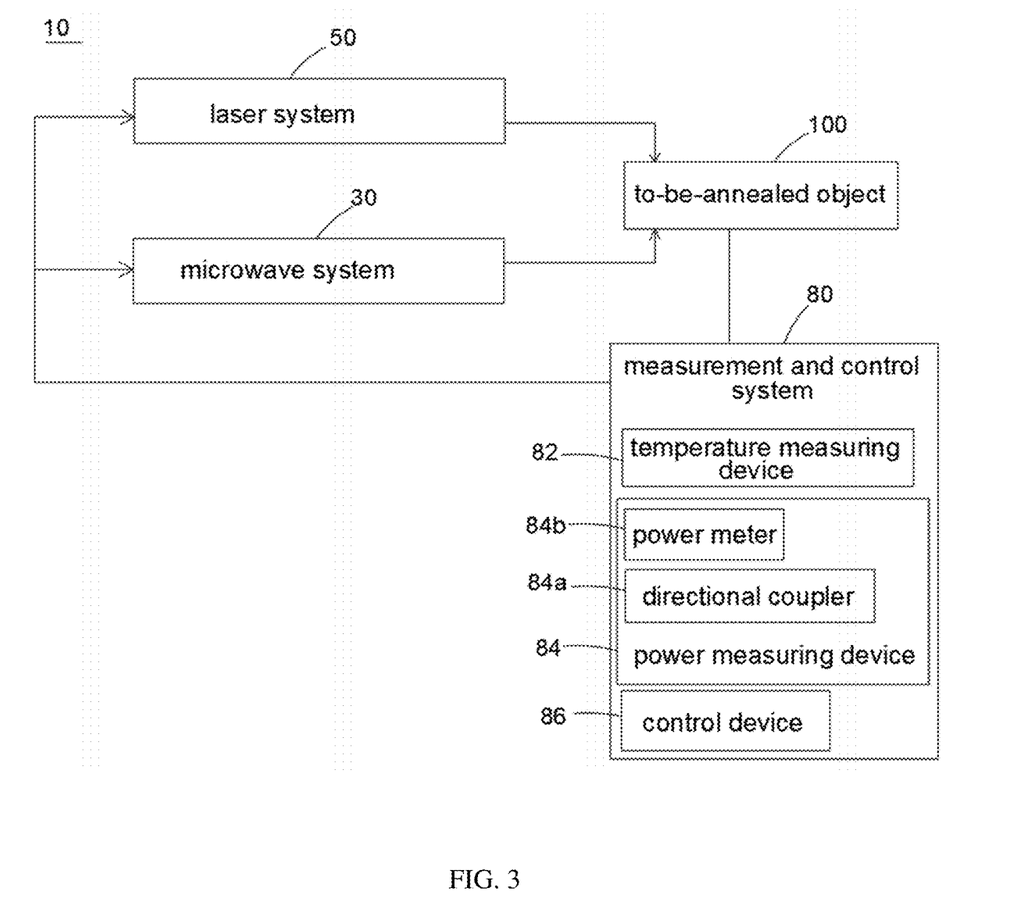
FIG. 3 is a system schematic diagram of the annealing system integrated with laser and microwave of the invention.

Please refer to FIG. 1 to FIG. 3. FIG. 1 is a schematic diagram of operation of an annealing system integrated with laser and microwave of the invention; FIG. 2 is a flow chart of operation of an annealing method integrated with laser and microwave of the invention; and FIG. 3 is a system schematic diagram of the annealing system integrated with laser and microwave of the invention. The invention provides an annealing system and an annealing method integrated with laser and microwave, which utilize a microwave system 30 to provide a microwave energy to a first area of a to-be-annealed object 100, and utilize a laser system 50 to provide a laser energy to a second area of the to-be-annealed object 100, thereby being capable of achieving an annealing effect, controlling the microwave energy and the laser energy required to provide, and reducing a time required for an overall annealing, for example. In addition, the invention is capable of monitoring and controlling operation of the microwave system 30 and the laser system 50 through a measurement and control system 80. In addition, according to actual manufacturing process requirements, the first area and the second area can be defined at any suitable position of the to-be-annealed object 100, can have any suitable area or volume, and can also have any suitable positional relationship. The microwave system 30 is capable of providing the microwave energy in any suitable first time interval, and the laser system 50 is also capable of providing the laser energy in any suitable second time interval.

For example, the first area of the invention is not limited to partially overlapping, completely overlapping or not overlapping with the second area, and an area or a volume of the first area of the invention is not limited to be larger than, equal to or smaller than that of the second area. For example, the first area can comprise the second area, or the second area can comprise the first area, or the first area can be adjacent to the second area, and even the first area and the second area can be independently defined on the to-be-annealed object 100. Moreover, the first time interval during which the microwave system 30 providing the microwave energy can partially overlap, completely overlap, or does not overlap with the second time interval during which the laser system 50 providing the laser energy. For example, the first time interval can comprise the second time interval, or the second time interval can comprise the first time interval, or the first time interval and the second time interval are adjacent to each other, or the first time interval and the second time interval can be independent. A duration of the first time interval can also be, for example, greater than, less than or equal to that of the second time interval.

For example, the invention provides an annealing system and an annealing method integrated with laser and microwave. A microwave annealing procedure is performed on the first area of the to-be-annealed object 100 by the microwave energy of a microwave to increase a temperature, and a laser annealing procedure is performed on the second area within the first area by the laser energy of a laser. In the invention, a temperature of the to-be-annealed object 100 is increased by the microwave energy, which is conducive to increasing a laser energy absorption rate of the to-be-annealed object 100 (semiconductor materials such as silicon or silicon carbide), so the invention is capable of reducing the laser energy required to perform the laser annealing procedure, or capable of reducing a time required for an overall annealing. Conversely, in the invention, a temperature of the to-be-annealed object 100 can also be increased by means of the laser energy, which is conducive to the to-be-annealed object 100 in absorbing the microwave energy. Moreover, the invention integrally provides the microwave energy for a non-second area and the second area, which is capable of reducing a temperature difference (thermal shock) between the non-second area (i.e., non-laser annealing area) and the second area (i.e., laser annealing area) to avoid formation of cracks or defects due to large stress differences.

The first area is defined on part or all of the to-be-annealed object 100, and the second area is defined on part or all of the first area, for example. The first area and the second area are not limited to be located in a depth or on a surface of the to-be-annealed object 100. Moreover, areas and volumes of the first area and the second area and a positional relationship between the first area and the second area of the invention are not limited to the examples described hereinafter, as long as a time required for an overall annealing can be reduced, a stress difference can be reduced, or the laser energy required to perform the laser annealing procedure can be reduced, any area and volume and positional relationship belong to the scope of protection claimed by the invention. The to-be-annealed object 100 can be, for example, any material suitable for annealing treatment, such as a substrate that has undergone modification treatment, separation treatment, ion implantation treatment or other semiconductor manufacturing process treatment, and the substrate can be, for example, a material for semiconductor manufacturing process, such as wafer or ingot, for example, but is not limited to, base plate materials such as Si, SiC, SiGe, Ge, GaAs, GaN, or InP. For example, the to-be-annealed object 100 is, for example, a silicon substrate on which ion implantation is completed, microwave annealing is used for the first area (surface source, gate), and laser annealing is used for the second area (deep P or N well). Alternatively, after the substrate is peeled off due to modification or external force, a modified area or a peeled surface (the first area/the second area) can be annealed, and microwave and laser annealing can be used at the same time to achieve effects of defect repair and lattice reset. In addition, the microwave system 30 of the invention is not limited to elevating a temperature of the to-be-annealed object 100 to a specific temperature, any increased temperature value can be applied to the invention as long as a laser energy absorption rate of the to-be-annealed object 100 can be increased or a stress difference can be reduced.

Please refer to FIG. 1, FIG. 2 and FIG. 3, an annealing system 10 of the invention comprises at least the microwave system 30, the laser system 50, and the measurement and control system 80. As shown in step S10, performing the microwave annealing procedure first, wherein the microwave system 30 generates a microwave 33 and irradiates the microwave 33 onto a first area of the to-be-annealed object 100, so as to utilize the microwave energy of the microwave 33 to increase a temperature of the first area to achieve an effect of performing the microwave annealing procedure. The to-be-annealed object 100 is carried on, for example, a carrier, and the carrier is, for example, a movable carrier, but not limited thereto, the carrier can also be, for example, a fixed carrier. The microwave system 30 provides the microwave energy with a first power, and the microwave energy is provided to the first area along a first axial direction. As shown in step S20, the laser system 50 of the invention generating a laser 54 and irradiating the laser 54 onto a second area of the to-be-annealed object 100. The microwave system 30 provides the microwave energy with the first power. The laser system 50 provides the laser energy with a second power, and the laser energy is provided to the second area along a second axial direction. A range of an included angle between the first axial direction and the second axial direction is about 0 degree to 180 degrees. For example, the first axial direction can be parallel (such as a same direction or an opposite direction) or perpendicular to the second axial direction, for example. An output mode of the microwave system 30 can be a continuous microwave source or an intermittent microwave source with a pulse width ranging from about 1 μs to about 1 ms. The first time interval during which the microwave system 30 providing the microwave energy to the first area can cover the second time interval during which the laser system 50 providing the laser energy to the second area, that is, the second time interval is preferably completely overlapping with the first time interval. Alternatively, the second time interval during which the laser system 50 providing the laser energy to the second area can cover the first time interval during which the microwave system 30 providing the microwave energy to the first area. However, this is only an example and is not intended to limit the invention, that is, the second time interval can, for example, only partially overlap with the first time interval, or even is not completely overlapping with the first time interval. Any time correspondence relationship between the microwave energy provided by the microwave system 30 and the laser energy provided by the laser system 50 belongs to the scope of protection claimed by the invention as long as a time required for an overall annealing can be reduced, a stress difference can be reduced, or the laser energy required to perform the laser annealing procedure can be reduced.

In the microwave system 30 of the invention, a wavelength range of the microwave 33 is about 1 mm to about 1 m, a frequency range of the microwave 33 is about 300 GHz to about 0.3 GHz, and a power of the microwave 33 ranges from about 200 watts to about 5,000 watts. The invention belongs to industrial application, and its usable frequencies belong to ISM band (Industrial Scientific Medical Band). According to the provisions of the ITU Radio Regulations, the microwave ranges are: 433.05-434.79 MHz, 902-928 MHz, 2400-2483.5 MHz, etc. The invention can use microwave frequencies of about 2400-2483.5 MHz, and even use frequencies that do not belong to the provisions of the ITU Radio Regulations, such as 500 MHz or other frequencies that require to apply for a license to use. In the laser system 50 of the invention, a wavelength of the laser 54 is, for example, about 150 nm to about 1600 nm, a range of moving speed is about 10 mm/sec to about 1000 mm/sec, a power range is about 10 mW to about 100 kW, a range of spot size is about 1 μm to about 50 μm; the laser 54 can be a pulsed laser, a frequency can range from about 1 Hz to about 1 MHz, and a pulse width can range from about 100 fs to about 100 ns.

The measurement and control system 80 of the annealing system 10 of the invention comprises a temperature measuring device 82, a power measuring device 84 and a control device 86. In step S30, the invention further comprises performing a measurement and control procedure, wherein the temperature measuring device 82 monitors a temperature value of the to-be-annealed object 100, and the power measuring device 84 measures a power variation of at least one of the microwave system 30 and the laser system 50, wherein the control device 86 correspondingly adjusts the first power of the microwave system 30 providing the microwave energy and/or adjusts the second power of the laser system 50 providing the laser energy according to the temperature value and power variation. For example, the invention is capable of increasing the first power of the microwave system 30 or reducing the second power of the laser system 50 according to the temperature value of the to-be-annealed object 100 and the power variation of the microwave system 30 and/or the laser system 50 obtained by monitoring. Therefore, the invention is capable of reducing a time required for an overall annealing, or capable of reducing the laser energy required for performing the laser annealing procedure.

The temperature measuring device 82 is, for example, an optical pyrometer, such as an infrared pyrometer, for preferably monitoring the temperature value of the to-be-annealed object 100 in real time. The control device 86 is, for example, a computer, the control device 86 receives a monitoring signal of the temperature measuring device 82 and the power variation measured by the power measuring device 84, so as to control the microwave system 30 and the laser system 50, such as increasing the first power of the microwave system 30 or reducing the second power of the laser system 50. The power measuring device 84 further comprises, for example, a directional coupler 84a and a power meter 84b. The directional coupler 84a is used to detect input and reflected microwave/laser signals. The detected signals are then sent to the power meter 84b for monitoring coupling between the microwave 33/the laser 54 and the to-be-annealed object 100. That is, the directional coupler 84a can be used to detect a forward signal of the microwave 33 provided by the microwave system 30 and a reflected signal from the to-be-annealed object 100, and/or detect a forward signal of the laser 54 provided by the laser system 50 and a reflected signal from the to-be-annealed object 100. Then, the directional coupler 84a sends the detected signals to the power meter 84b for real-time monitoring of coupling changes (e.g., the power variation) between the microwave 33 and/or the laser 54 and the to-be-annealed object 100. Thereby the control device 86 is capable of receiving power variation data and correspondingly generating an adjustment command in real time according to the power variation, so as to control operation of at least one of the microwave system 30 and the laser system 50. In addition, the measurement and control system 80 of the invention can optionally further comprise, for example, a monitor electrically connected to the control device 86 to display monitoring results of each component of the measurement and control system 80 in real time, for example, all microwave, laser and temperature data can be input into the computer for recording and processing and displaying on the monitor.

Figure 4:
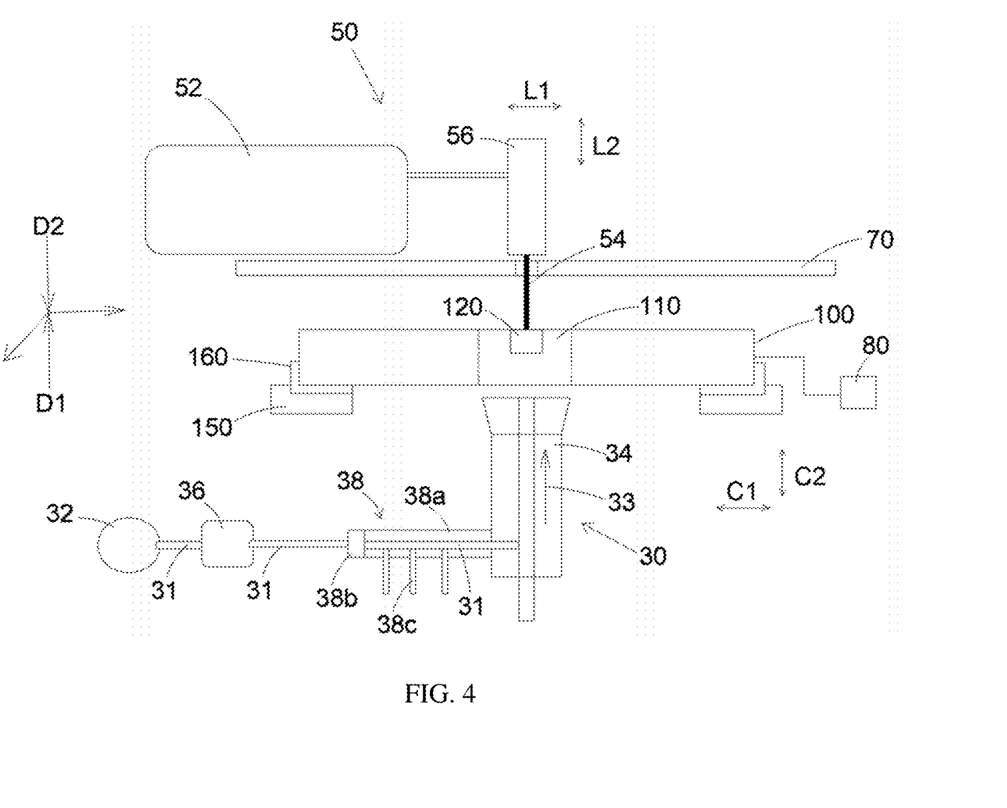
FIG. 4 is a schematic structural diagram of the annealing system according to a first embodiment of the invention.

Please refer to FIG. 1 to FIG. 4. FIG. 4 is a schematic structural diagram in which the microwave energy and the laser energy are provided from opposite sides to the to-be-annealed object in the annealing system according to a first embodiment of the invention. In the first embodiment, the microwave system 30 integrally provides the microwave energy to the to-be-annealed object 100 in the first area 110, and the laser system 50 scans to provide the laser energy to the to-be-annealed object 100 in the second area 120. In the first embodiment, the first area 110 comprises the second area 120, that is, an area and a volume of the first area 110 are larger than those of the second area 120. Moreover, in the first embodiment, the first time interval during which the microwave system 30 providing the microwave energy to the first area 110 can cover the second time interval during which the laser system 50 providing the laser energy to the second area 120, that is, the second time interval completely overlaps with the first time interval. Wherein the microwave energy is provided onto the first area 110 of the to-be-annealed object 100 from the first axial direction D1 (from bottom to top as shown in FIG. 4), the laser energy is provided onto the second area 120 of the to-be-annealed object 100 from the second axial direction D2 (from top to bottom as shown in FIG. 4), and the first axial direction D1 is overlapped with the second axial direction D2. The annealing system 10 of the invention comprises the microwave system 30, the laser system 50, and the measurement and control system 80. The microwave system 30 comprises at least one microwave generator 32 and a resonant cavity 34. The microwave generator 32 is, for example, a magnetron for generating the microwave 33. The resonant cavity 34 is, for example, a coaxial resonator. For example, the resonant cavity 34 is, for example, a $TE_{10}$ mode resonant cavity, and its interior can be a hollow or solid waveguide element, which can be adjusted depending on actual use, as long as the microwave 33 can be guided and the microwave 33 can be caused to resonate therein, any resonant cavity can be applied in the invention. For example, the microwave 33 generated by the microwave generator 32 is transmitted to the resonant cavity 34 through guidance of a metal rod 31, and the resonant cavity 34 then guides the microwave 33 generated by the microwave generator 32 onto the first area 110 of the to-be-annealed object 100, thereby, the first area 110 of the to-be-annealed object 100 is integrally heated to increase a temperature thereof. The microwave system 30 further optionally comprises, for example, an isolator 36 and a matcher 38 disposed between the microwave generator 32 and the resonant cavity 34. The microwave system 30 generates the microwave 33 by the microwave generator 32 (such as a magnetron), and the microwave 33 is transmitted onto the first area 110 of the to-be-annealed object 100 through guidance of the resonant cavity (coaxial resonator) 34 to perform the microwave annealing procedure. Wherein, a transmission path of the microwave 33 (such as the resonant cavity 34) is preferably further provided with the matcher 38, which is capable of reducing an amount of microwave reflection, so that the microwave 33 can effectively enter the resonant cavity 34 to be transmitted onto the to-be-annealed object 100 along a chamber of the resonant cavity 34 (such as a ring-shaped cylindrical chamber). Wherein, an axis of the resonant cavity 34 is not limited to a hollow or a solid structure, as long as the microwave 33 can be guided, any axial structure can be applied in the invention. The matcher 38 is composed of, for example, a coaxial tube 38a, a metal plate 38b, and a metal rod 38c. The isolator 36 is preferably disposed between the microwave generator 32 and the resonant cavity 34, which can provide an effect of transmitting the microwave 33 in one direction, and the isolator 36 is preferably disposed between the microwave generator 32 and the matcher 38. However, the above-mentioned components and configurations of the microwave system 30 are only examples and are not intended to limit the invention. The microwave system 30 can be any type of microwave source, as long as the microwave 33 can be provided, any type of microwave source belongs to the scope of protection claimed by the invention.

In the annealing system 10 of the first embodiment, the laser system 50 uses the laser generator 52 to generate the laser 54, the laser 54 is a pulsed light, and the laser 54 is transmitted through a lens set 56 onto the second area 120 of the to-be-annealed object 100. In the invention, the to-be-annealed object 100 can be horizontally moved by a movable carrier (as shown by the horizontal double arrow C1 in FIG. 4) or the pulsed light can be horizontally moved by the laser generator 52 (as shown by the horizontal double arrow L1 in FIG. 4), so that the second area 120 of the to-be-annealed object 100 is irradiated by horizontal scanning of the pulsed light. In addition, the invention can further, for example, use a movable carrier to vertically move the to-be-annealed object 100 (i.e., the laser generator 52 is fixed in a longitudinal direction, and the carrier is movable in a longitudinal direction, as shown by the vertical double arrow C2 on the right side of FIG. 4) or the pulsed light can be vertically moved by the laser generator 52 (that is, the laser generator 52 is movable in a longitudinal direction, and the carrier is fixed in a longitudinal direction, as shown by the vertical double arrow L2 in FIG. 4), so that the second area 120 of the to-be-annealed object 100 is irradiated by vertical scanning of the pulsed light. In other words, the invention is capable of optionally adjusting a depth upward and downward correspondingly at which a focal point of the pulsed light generated by the laser generator 52 irradiates the to-be-annealed object 100 according to a form (e.g., shape) of the to-be-annealed object 100 in the annealing procedure to achieve a better annealing effect.

The second area 120 can be optionally located on part or all of the first area 110, depending on actual requirements. The laser 54 generated by the laser generator 52 can scan, for example, in a direction of a radial section or an axial section to provide energy to the second area 120 of the to-be-annealed object 100, wherein the laser 54, for example, can also scan along a direction of a radial section or an axial section, and its scanning path is not particularly limited, as long as the laser energy can be provided to the second area 120 of the to-be-annealed object 100, any scanning direction or scanning path can be applied to the invention. Moreover, since the second area 120 is located in the first area 110, and the invention has raised a temperature of the first area 110 (including the second area 120) by the microwave energy provided by the microwave system 30, it is conducive to increasing a laser energy absorption rate of the to-be-annealed object 100 in the second area 120, so the invention is capable of reducing the laser energy required for performing the laser annealing procedure, or capable of reducing a time required for an overall annealing. Moreover, the invention provides the microwave energy integrally for the first area 110 and the second area 120, which is capable of reducing a temperature difference between the second area 120 (i.e., laser annealing area) and the non-second area (i.e., non-laser annealing area) to avoid cracks or defects due to large stress differences.

In addition, the annealing system 10 of the invention can optionally be provided with a microwave absorbing element 70, the microwave absorbing element 70 and the microwave system 30 (such as the microwave generator 32) are located on opposite sides of the to-be-annealed object 100, aiming to reduce reflection of the microwave 33 from another side to avoid unwanted scattering to improve an uniformity of microwave absorption. If the microwave absorbing element 70 is located between the laser system 50 and the to-be-annealed object 100, the microwave absorbing element 70 can be provided with a through hole according to actual conditions for the lens set 56 or the laser 54 to penetrate therethrough. The microwave absorbing element 70 can be a microwave absorbing element layer composed of any microwave absorbing material, as long as an effect of absorbing the microwave 33 can be provided, any microwave absorbing material belongs to the scope of protection claimed by the invention.

Figure 5:
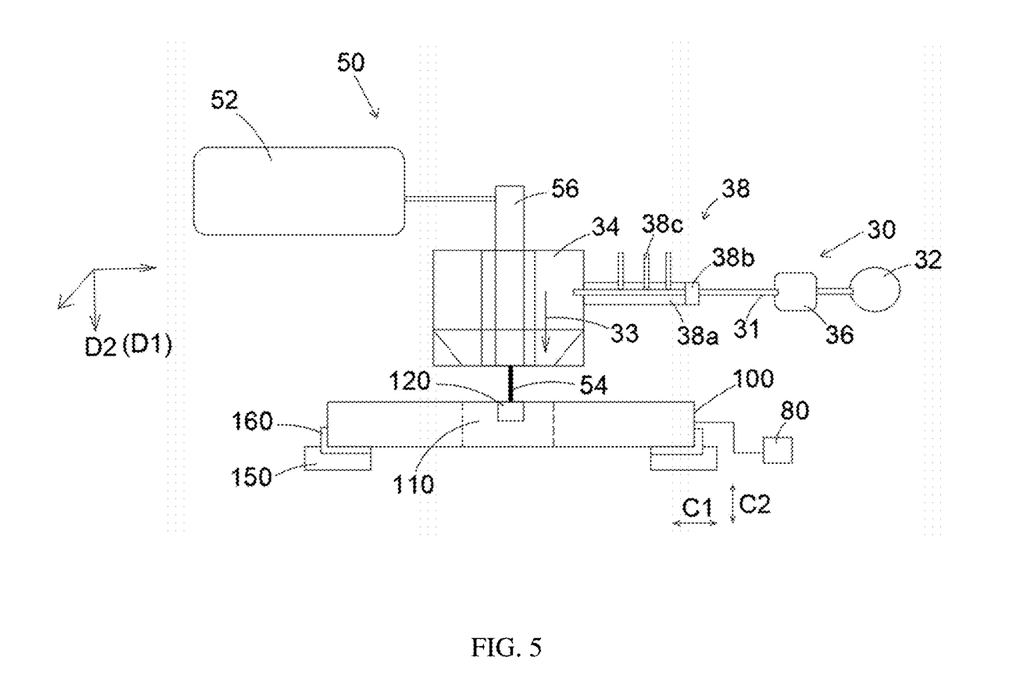
FIG. 5 is a schematic structural diagram of the annealing system according to a second embodiment of the invention.

Please refer to FIG. 1, FIG. 2 and FIG. 5. FIG. 5 is a schematic structural diagram in which the microwave energy and the laser energy are provided to the to-be-annealed object from a same side in the annealing system according to a second embodiment of the invention. Difference between the second embodiment and the first embodiment are that the microwave energy and the laser energy of the second embodiment are provided onto the to-be-annealed object 100 from a direction the same as the first axial direction D1, and the laser 54 generated by the laser system 50 is coaxial with the microwave 33 provided by the microwave system 30. For example, the microwave 33 passes through the resonant cavity 34 along the first axial direction D1 (from top to bottom as shown in FIG. 5) and is transmitted onto the first area 110 of the to-be-annealed object 100, while the laser 54 passes through the resonant cavity 34 along the second axial direction D2 (from top to bottom as shown in FIG. 5, which is the same as the first axial direction D1) and is transmitted onto the second area 120 of the to-be-annealed object 100. For example, the lens set 56 of the laser system 50 is coaxially disposed on the resonant cavity 34 of the microwave system 30. The lens set 56 is preferably located on an axis of the resonant cavity 34, and is not limited to being located outside the resonant cavity 34 or penetrating into its interior (as shown in FIG. 5), so the resonant cavity 34 is not limited to being a transparent material or an opaque material, as long as the laser 54 can be irradiated onto the second area 120 of the to-be-annealed object 100, any location or material belongs to the scope of protection claimed by the invention.

Figure 6:
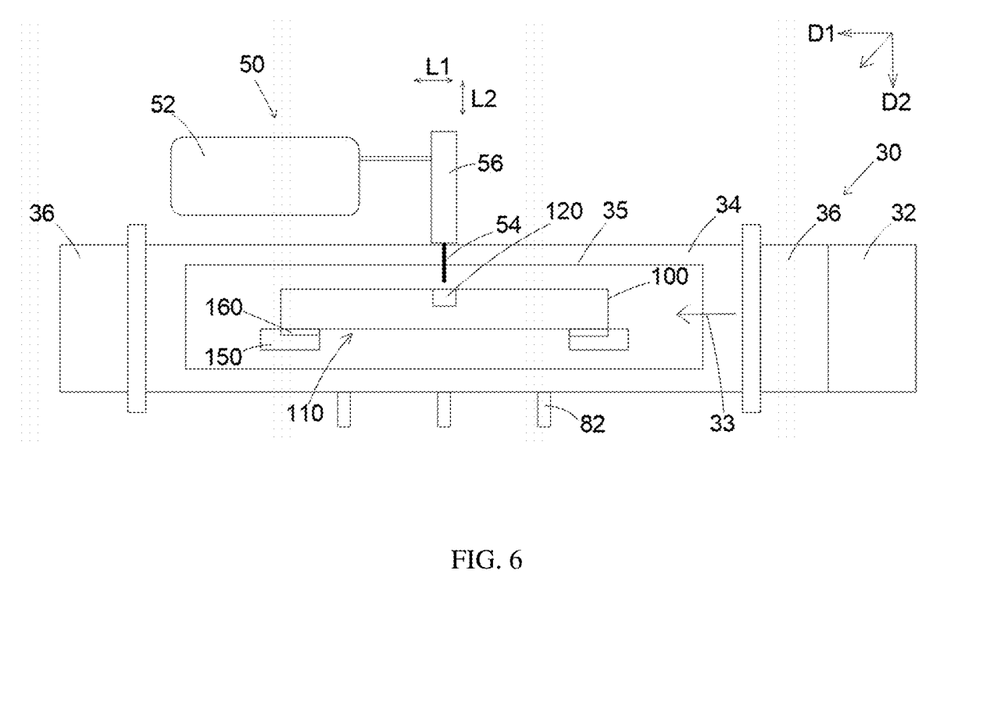
FIG. 6 is a schematic structural diagram of the annealing system according to a third embodiment of the invention.

Please refer to FIG. 1, FIG. 2 and FIG. 6. FIG. 6 is a structural schematic diagram in which the microwave energy and the laser energy are provided from a vertical side to the to-be-annealed object in the annealing system according to a third embodiment of the invention. A difference between the third embodiment and the other embodiments is that a design of the microwave system 30 is different, wherein the microwave energy is provided onto the first area 110 of the to-be-annealed object 100 from the first axial direction D1 (from right to left as shown in FIG. 6), the laser energy is provided onto the second area 120 of the to-be-annealed object 100 from the second axial direction D2 (from top to bottom as shown in FIG. 6), and the first axial direction D1 is perpendicular to the second axial direction D2. The microwave system 30 of the third embodiment comprises at least one microwave generator 32 and the resonant cavity 34 disposed coaxially. The microwave system 30 further optionally comprises the isolator 36 disposed between the microwave generator 32 and the resonant cavity 34, which is capable of providing effects of unidirectionally transmitting the microwave 33 and absorbing reflected microwaves. In addition, the microwave system 30 can further optionally comprise the matcher 38 (not shown) located between the microwave generator 32 and the resonant cavity 34, and preferably disposed between the isolator 36 and the resonant cavity 34, which is capable of reducing an amount of microwave reflection, so that the microwave 33 can effectively enter the resonant cavity 34 so as to be transmitted onto the to-be-annealed object 100. The resonant cavity 34 of the third embodiment is further optionally provided with an opening 35, so that the carrier 150 can use the opening 35 to send the first area 110 to be processed on the to-be-annealed object 100 into the resonant cavity 34, or to move a position in the resonant cavity 34. Therefore, the resonant cavity 34 can also serve as a microwave reaction cavity, so that the microwave annealing can be performed in the resonant cavity 34. The lens set 56 of the laser system 50 is disposed on the resonant cavity 34 of the microwave system 30, the lens set 56 can be located on the resonant cavity 34, and is not limited to being located outside the resonant cavity 34 or penetrating into its interior, so the resonant cavity 34 can be made of a transparent material or an opaque material, or the resonant cavity 34 can also be provided with a hole to allow the laser 54 to pass through, as long as the laser 54 can be irradiated from the second axial direction D2 onto the second area 120 of the to-be-annealed object 100, any location or material belongs to the scope of protection claimed by the invention.

Figure 7:
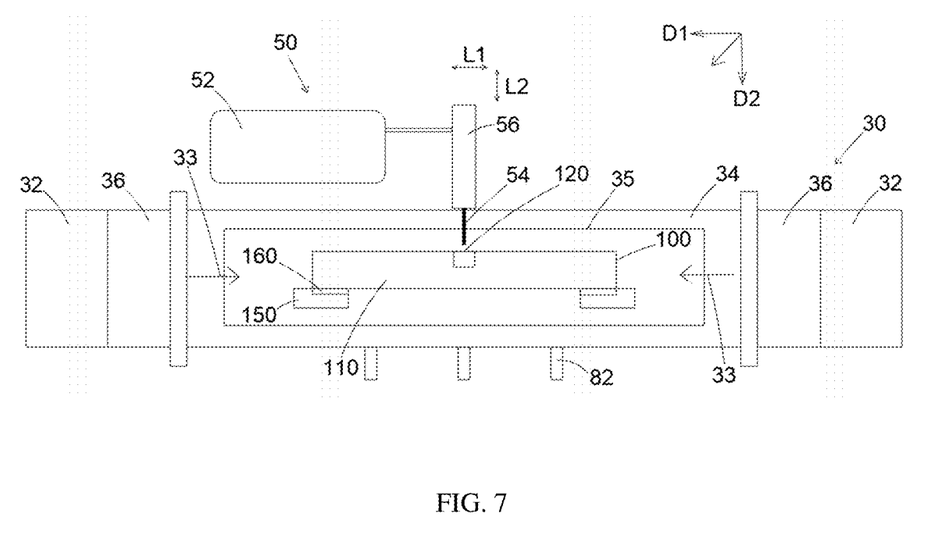
FIG. 7 is a schematic structural diagram of the annealing system according to a fourth embodiment of the invention.
Figure 8:
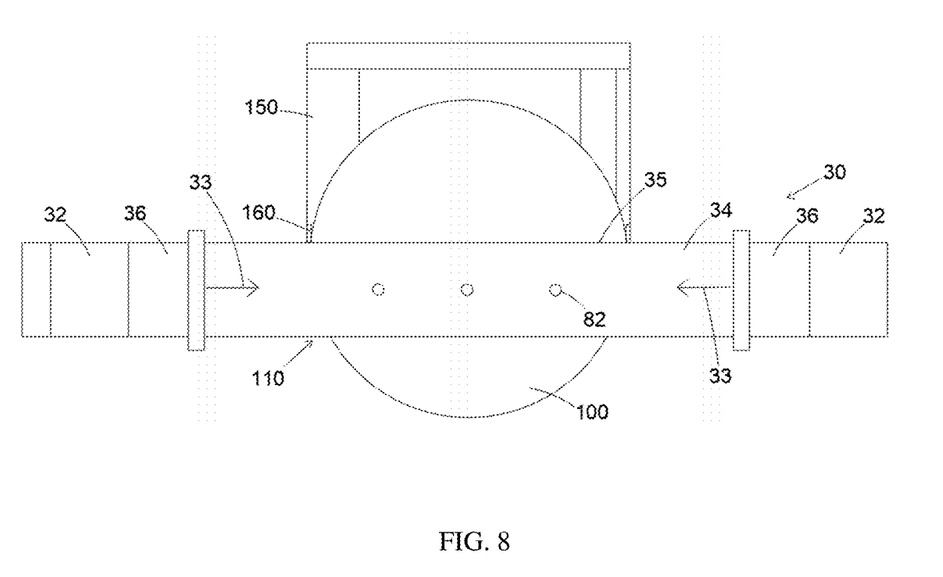
FIG. 8 is a schematic diagram obtained from another viewing angle of FIG. 7.

Please refer to FIG. 1, FIG. 2, FIG. 7 and FIG. 8. FIG. 7 is a structural schematic diagram in which the microwave energy and the laser energy are provided from a vertical side to the to-be-annealed object in the annealing system according to a fourth embodiment of the invention. FIG. 8 is a schematic diagram obtained from another viewing angle of FIG. 7. A difference between the fourth embodiment of the invention and the third embodiment is that the microwave system 30 of the fourth embodiment has dual microwave generators (i.e., two microwave generators 32), wherein the dual microwave generators generate dual microwaves, which are respectively introduced into the resonant cavity 34 from two opposite directions of the resonant cavity 34 in order that the dual microwaves can be guided onto the first area 110 of the to-be-annealed object 100, so that the first area 110 of the to-be-annealed object 100 is heated evenly.

In the above embodiments, the carrier 150 of the invention has, for example, a carrier base 160 for carrying the to-be-annealed object 100. The carrier base 160 is not limited to a specific material, it can be composed of any suitable material, and an outer shape of the carrier base 160 is not particularly limited, it can be a plate, a groove or a box, as long as the to-be-annealed object 100 can be carried, any material or outer shape is applicable to the invention. For example, the carrier base 160 can be composed of a microwave absorbing material with which more than 50% microwave penetration can be enabled to heat the to-be-annealed object 100. Porous sintered silicon carbide with a porosity of 20% to 30% is a material suitable for the carrier base 160, for the porous silicon carbide produced by sintering, a penetration depth is even larger to be capable of achieving the above-mentioned functions of the carrier base 160, and at the same time, it can be heated and cooled many times without cracking and has a long service life. In addition, graphite can also be used as a material of the carrier base 160. Taking the to-be-annealed object 100 as a silicon carbide wafer as an example, since a thickness of the silicon carbide wafer is very thin, if being directly exposed to microwaves, edges of the wafer are prone to produce high electric field intensity distribution, which can cause overheating and even point discharge. Therefore, the carrier base 160 can cover the edges of the silicon carbide wafer to be annealed, so as to prevent the edges of the silicon carbide wafer from overheating. For example, the carrier base 160 comprises a seat and an upper cover, wherein the upper cover is, for example, detachably covered on the seat in order to form an accommodating chamber by surrounding the accommodating chamber, and the to-be-annealed object 100 is detachably positioned in the accommodating chamber 33 surrounded and formed by the seat and the upper cover. Although the carrier base 160 is used for illustration, it is not intended to limit the invention, as long as the carrier base 160 can be provided for placing the to-be-annealed object 100, it belongs to the scope of protection claimed by the invention.

Figure 9:
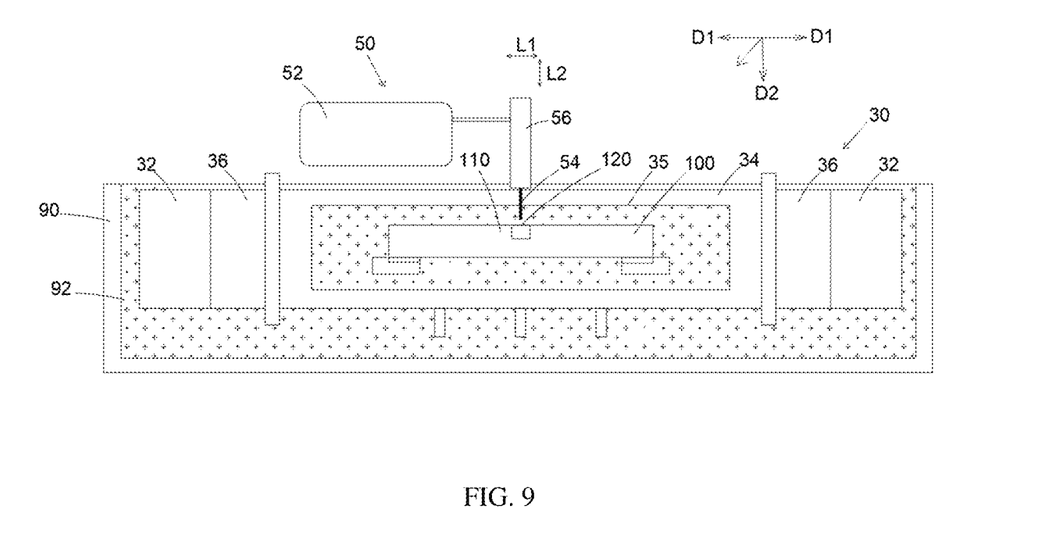
FIG. 9 is a schematic diagram of an annealing device of the invention performing annealing in a heat source.

In addition, in each of the above-mentioned preferred embodiments, as shown in FIG. 9, an annealing device of the invention can further comprise, for example, a heat source for heating the to-be-annealed object 100 during performing the annealing procedure. Wherein the heat source is, for example, the laser system 50, the microwave system 30, a heated liquid tank 90, another laser system and/or an infrared light source. Taking the heated liquid tank 90 as the heat source as an example, the heated liquid tank 90 has a liquid 92 therein so that the to-be-annealed object 100 is immersed in the liquid 92. The heated liquid tank 90 can be, for example, a hot oil tank and provided with an oil therein, preferably a hot oil, more preferably a high-temperature resistant oil, such as fluorinated oil, in all or part of the steps of the annealing procedure, the to-be-annealed object 100 can be immersed in the oil to be capable of reducing unnecessary cracks or crack expansion caused by thermal shock, and capable of increasing a thermal uniformity. In addition, the heated liquid tank 90 is not limited to be contained with the oil, any heatable liquid can be selected as a heat source to be placed in the heated liquid tank 90 according to requirements.

In summary, the annealing system and the annealing method integrated with laser and microwave of the invention have the following advantages:

(1) The invention uses the microwave energy and the laser energy to perform the synergistic annealing procedure, which is conducive to combining the advantages of microwave annealing and laser annealing.

(2) Raising a temperature of the to-be-annealed object by the microwave energy is conducive to increasing the laser energy absorption rate of the to-be-annealed object, so the laser energy required for performing the laser annealing procedure can be reduced, or a time required for the overall annealing can be reduced.

(3) By increasing temperatures of the second area and the other area (the non-second area) of the to-be-annealed object by the microwave energy, a temperature difference (thermal shock) between these two areas can be reduced to avoid cracks or defects caused by large differences in stress.

(4) The invention using the microwave energy to anneal the entire to-be-annealed object is capable of avoiding defects caused by a large temperature gradient, and also capable of solving the problem of excessive diffusion of implanted ions.

(5) In the invention, the microwave energy is used to anneal the whole to-be-annealed object, a specific laser wavelength is selected to correspond to the annealing target, and laser annealing can be optionally performed on an area with a specific depth.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An annealing system integrated with laser and microwave, comprising:
    a microwave system, the microwave system provides a microwave energy to a first area of a to-be-annealed object for annealing the first area of the to-be-annealed object;
    a laser system, the laser system provides a laser energy to a second area of the to-be-annealed object for annealing the second area of the to-be-annealed object, wherein the microwave energy provided by the microwave system is provided to the first area along a first axial direction, the laser energy provided by the laser system is provided to the second area along a second axial direction, and wherein a first time interval during which the microwave system provides the microwave energy to the first area covers a second time interval during which the laser system provides the laser energy to the second area; and
    a measurement and control system, the measurement and control system comprising a temperature measuring device, a power measuring device and a control device, the temperature measuring device monitoring a temperature value of the to-be-annealed object, the power measuring device measuring a power variation of at least one of the microwave energy provided by the microwave system and the laser energy provided by the laser system, wherein the control device correspondingly adjusts a first power of the microwave system providing the microwave energy and adjusts a second power of the laser system providing the laser energy according to the temperature value and the power variation.

2. The annealing system integrated with laser and microwave as claimed in claim 1, wherein the first area comprises the second area.

3. The annealing system integrated with laser and microwave as claimed in claim 1, wherein the microwave system integrally provides the microwave energy to the first area of the to-be-annealed object, and the laser system provides the laser energy to the second area of the to-be-annealed object by scanning.

4. The annealing system integrated with laser and microwave as claimed in claim 1, wherein an angle between the first axial direction and the second axial direction is 0 degrees or 90 degrees or 180 degrees.

5. The annealing system integrated with laser and microwave as claimed in claim 1, wherein the laser system comprises a laser generator and a lens set, the laser generator generates a laser, and the lens set guides the laser onto the second area of the to-be-annealed object.

6. The annealing system integrated with laser and microwave as claimed in claim 5, wherein the microwave system comprises at least one microwave generator and a resonant cavity, the microwave generator generates a microwave, and the resonant cavity guides the microwave onto the first area of the to-be-annealed object.

7. The annealing system integrated with laser and microwave as claimed in claim 1, wherein the microwave system and the laser system respectively provide the microwave energy and the laser energy from opposite sides of the to-be-annealed object.

8. The annealing system integrated with laser and microwave as claimed in claim 1, wherein the microwave system and the laser system respectively provide the microwave energy and the laser energy from a same side of the to-be-annealed object.

9. The annealing system integrated with laser and microwave as claimed in claim 6, wherein the lens set of the laser system is coaxially disposed on the resonant cavity of the microwave system to guide the laser onto the second area of the to-be-annealed object.

10. The annealing system integrated with laser and microwave as claimed in claim 1, wherein the microwave system and the laser system respectively provide the microwave energy and the laser energy from a vertical side of the to-be-annealed object to the to-be-annealed object.

11. The annealing system integrated with laser and microwave as claimed in claim 1, wherein the microwave system comprises two microwave generators and a resonant cavity, the two microwave generators generate two microwaves, and the resonant cavity respectively guides the two microwaves onto the first area of the to-be-annealed object from two opposite directions of the first axial direction.

12. The annealing system integrated with laser and microwave as claimed in claim 1, further comprising a microwave absorbing element, and the microwave absorbing element and the microwave system are located on opposite sides of the to-be-annealed object.

13. The annealing system integrated with laser and microwave as claimed in claim 6, wherein the resonant cavity of the microwave system is penetrated with an opening, and the to-be-annealed object is moved positionally in the resonant cavity through the opening to receive the microwave energy.

14. The annealing system integrated with laser and microwave as claimed in claim 1, wherein the power measuring device measures a forward signal or a reflected signal of at least one of the microwave system providing the microwave energy with a microwave and the laser system providing the laser energy with a laser to obtain the power variation.

15. The annealing system integrated with laser and microwave as claimed in claim 1, wherein the power measuring device comprises measuring at least one of a forward signal and a reflected signal of the microwave system providing the microwave energy with a microwave, and at least one of a forward signal and a reflected signal of the laser system providing the laser energy with a laser.

16. The annealing system integrated with laser and microwave as claimed in claim 6, wherein the microwave system further comprises an isolator and a matcher disposed between the microwave generator and the resonant cavity.

17. The annealing system integrated with laser and microwave as claimed in claim 1, wherein the first area or the second area is located in a depth or on a surface of the to-be-annealed object.

* * * * *